May 16, 1961
E. J. KOHLMEYER
2,984,562
PROCESS FOR THE PRODUCTION OF LEAD FROM ITS
SULFIDIC ORES OR CONCENTRATES THEREOF
Filed March 10, 1958
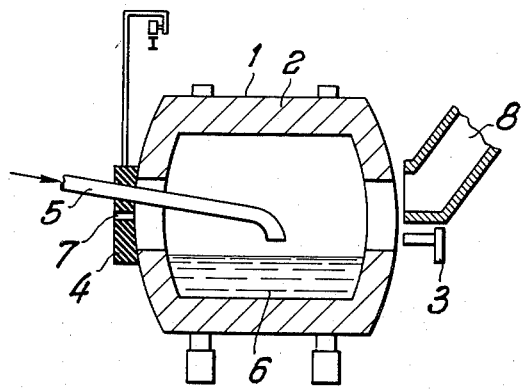
Inventor:
ERNST J. KOHLMEYER
By Bailey, Stephens & Huettig
ATTORNEYS

United States Patent Office 2,984,562
Patented May 16, 1961

---

2,984,562

PROCESS FOR THE PRODUCTION OF LEAD FROM ITS SULFIDIC ORES OR CONCENTRATES THEREOF

Ernst J. Kohlmeyer, Berlin-Grunewald, Germany, assignor to Metallgesellschaft Aktiengesellschaft, Frankfurt am Main, Germany Filed Mar. 10, 1958, Ser. No. 720,392

Claims priority, application Germany Mar. 14, 1957

6 Claims. (Cl. 75—77)

The present invention relates to an improved process for the direct production of lead from its sulfidic ores or concentrates thereof.

Lead is primarily produced from sulfidic ores by methods which essentially fall into one of two groups. The older of the methods is the so-called roasting-reaction process which is based upon the following equation:

$$PbS + O_2 = Pb + SO_2 \qquad (1)$$

This reaction, however, proceeds over a number of intermediate reactions, the sum of which gives the result indicated by the equation. Even though this process would appear to be very advantageous, it has been displaced to a far reaching degree in the last few decades by the roasting-reduction process. The primary reasons for this are that zinc and silica are very disturbing in the roasting-reaction process and that increasingly fine grained concentrates have become available for processing and these cause difficulties because of their small grain size.

The roasting-reduction process is in general based upon a dead roasting corresponding to the following equation:

$$PbS + \tfrac{3}{2}O_2 \rightarrow PbO + SO_2 \qquad (2)$$

and a subsequent reduction according to the following equation:

$$PbO + C \rightarrow Pb + CO$$

Among the procedures belonging to the roasting-reaction process type, there also is an older known process in which metallic lead, lead sulfate and $PbS_2O_2$ are produced by blowing air or oxygen through molten lead sulfide in a converter provided with a basic lining. This process, however, is not well suited for the production of metallic lead from sulfidic ores, as a considerable quantity of the lead is converted to lead sulfate and $PbS_2O_2$.

The process according to the invention is an improvement of the roasting-reaction type of process and renders it possible also to produce metallic lead directly from silica containing and fine grained lead ore concentrates. According to the invention it was unexpectedly found that concentrated oxygen containing gases are not, under certain conditions, merely the equivalent of air, so that the only advantage to be expected would be the production of more concentrated roasting gases, which advantage, however, would be counteracted by a considerably increased generation of smoke. To the contrary, it was unexpectedly found that when concentrated oxygen containing gas or pure oxygen is blown on the upper surface of a lead sulfide melt a sharply limited burning or incandescent spot is formed in a manner similar to that formed in the refining of molten crude iron with oxygen and that the reaction according to Equation 1 proceeds smoothly at such spot, while the atmosphere thereabove remains practically clear of smoke.

That this would be the case is especially surprising, as it is known that lead sulfide, as well as lead oxide have a considerable vapor pressure, even at relatively low temperatures, so that considerable evaporation losses occur in all known thermal processes for the production of lead. It was consequently to be expected that the use of a gas stream whose oxygen content is greater than that of air and especially of relatively pure oxygen, that is, a gas stream containing at least 90% $O_2$, would cause greater evaporation losses than with the previously known processes. However, as was found according to the invention, this is not the case.

This unexpected result may be explained in that when a concentrated oxygen containing gas is blown onto the surface of a lead sulfide melt the reaction does not proceed over lead oxide as in the usual hearth processes, but rather over lead sulfate or basic lead sulfate. Furthermore, when concentrated oxygen containing gases are employed, the roasting-reaction according to Equation 1 is so accelerated that it proceeds considerably more rapidly than the evaporation despite the increase in temperature engendered by the use of the more concentrated oxygen.

Preferably, according to the invention, the concentrated oxygen stream is blown onto the surface of the molten lead sulfide bath at a point which is as far removed as possible from the walls of the furnace employed, namely, about the middle of the bath surface. In this way an additional advantage is obtained in that chemically corrosive lead oxide and lead sulfate do not come into contact with the lining of the furnace. It is consequently possible when operating according to this preferred embodiment of the invention to use normal lined furnaces, especially non-stationary furnaces, such as short drum rotary furnaces and rocking furnaces, as the linings thereof only come into contact with lead sulfide and the metallic lead produced in the process.

A furnace which is especially adapted for carrying out the process according to the invention is a furnace which is rotatable through 360° about its longitudinal axis and transverse axis and provided with only a single opening, such as, for example, has been described in German application M 24,173 VI/40a, as a heating flame is only required during fusion of the furnace charge as additional heating is not required during the period when the concentrated oxygen is supplied to the surface of the melted charge.

The use of the indicated types of mechanical furnaces for the process according to the invention has special advantage in that it is possible to carry out the fusion of the charge in an especially short time and thereby reduce the evaporation losses even more. Also, the comparatively great depth of the bath and relatively small bath surface assist in reducing evaporation losses.

A further advantage of the process according to the invention resides in that the processing of finest grained concentrates produces no difficulties. It is furthermore possible to employ silica containing starting materials as in such instance it is only necessary to draw off the floating oxide phase which contains all of the silica before the stream of concentrated oxygen is blown on the surface of the molten bath. If necessary, suited known fluxes which assist in the separation of silica can be added to the furnace charge. When the concentrated oxygen containing gas stream is blown upon the surface of the molten lead sulfide, the latter is quickly converted to metallic lead in the incandescent spot, and the metallic lead produced sinks down through the bath so that fresh lead sulfide constantly flows to the incandescent spot. The application of the stream of concentrated oxygen is stopped when a lead oxide skin persists.

The advantages of the process according to the invention are the greatest when as concentrated oxygen as possible is employed and it primarily is a question of economics as to how high a concentration is selected. In general, the economic optimum is achieved with oxygen concentrations of 90 to 95%, especially when the oxygen available is produced by the fractionation of air. However, the improved effects of reduced evaporation and smoke generations according to the invention are present to a considerable degree with much lower oxygen concentrations and it is possible according to the invention, for example, to reduce the evaporation losses considerably when a gas containing only about 35% of oxygen is employed. The use of such lower concentrations of oxygen may be the most economical when oxygen is available as a cheap electrolytic by-product but in insufficient quantities.

The accompanying drawing schematically discloses an apparatus suitable for carrying out the process according to the invention.

The following example with reference to the drawing will serve to illustrate the manner in which the process according to the invention can be carried out.

*Example*

150 kg. of lead sulfide ore concentrate containing 82% Pb and 3% $SiO_2$ were introduced into an experimental rotary short drum furnace 1 which was provided with a magnesite lining 2 and had a usable capacity of 100 liters. The charge was fused during rotation of the furnace with the aid of oil burner 3. After the charge had fused, 11 kg. of silica containing slag containing about 13% Pb were drawn off. Thereupon a water cooled conduit 5 was introduced through furnace door 4 and a stream of 98% oxygen was blown therethrough at a rate of about 200 liters per min. substantially vertically upon the surface of the molten charge 6. The formation of a light incandescent spot upon the surface of the charge below the outlet opening of conduit 5 was observed through opening 7. The $SO_2$ which was evolved was withdrawn with the aid of hood 8. The temperature of the molten bath at first slowly increased from the original temperature of 1160° C. to 1333° C. and then quickly to 1380° C. and after thirty-one minutes had elapsed from the time when the oxygen stream was first blown on the surface of the molten charge, the temperature dropped to 1350° C. The application of the oxygen rich stream was then stopped and the melt withdrawn. The melt consisted of 102 kg. of metallic lead and 15.2 kg. of lead oxide slag containing 65% Pb. This slag was added together with 11 kg. of fly ash which were recovered from the exhaust gases of the process by filtration to the next charge for the furnace.

In another run using a gas stream with a lower oxygen concentration, namely, about 25%, and a starting temperature of the melted charge of 1178° C., the temperature rose to 1295° C. during the blowing on of the oxygen rich gas stream.

In both runs the furnace was rotated at about 1 revolution p.min.

I claim:

1. In a process for the direct production of metallic lead from lead sulfide containing materials by the roasting-reaction procedure, the steps which comprise melting such lead sulfide containing materials without roasting to produce a molten lead sulfide bath and then projecting a stream of a gas having a greater concentration of oxygen than air substantially vertically against a limited spot on the surface of said molten bath spaced from the side edges of said surface to produce a limited incandescent spot on such surface.

2. The process of claim 1 in which the concentration of oxygen in the gas stream is at least 35%.

3. The process of claim 1 in which the concentration of oxygen in the gas stream is at least 90%.

4. The process of claim 1 in which said process is carried out in a non-stationary lined furnace and the spot against which the oxygen containing gas stream is directed is such that the incandescent spot produced on the surface of the molten bath is spaced from the lining of the furnace.

5. The process of claim 4 in which said process is carried out in a rotary short drum furnace.

6. The process of claim 4 in which said process is carried out in a flame fired rotary furnace having only a single opening which can be rotated 360° about its longitudinal and transverse axis.

References Cited in the file of this patent

UNITED STATES PATENTS

| | | |
|---|---|---|
| 2,416,628 | Kalling et al. | Feb. 25, 1947 |
| 2,878,115 | Schane et al. | Mar. 17, 1959 |